United States Patent [19]

Natta et al.

[11] 4,025,497

[45] * May 24, 1977

[54] ETHYLENE-OLEFIN-ALKENYL NORBORNENE ELASTOMERS

[75] Inventors: Giulio Natta; Alberto Valvassori, both of Milan, Italy; Guido Sartori, Roselle, N.Y.; Nazzareno Cameli, Milan, Italy

[73] Assignee: Montecatini Edison S.p.A., Milan, Italy

[ * ] Notice: The portion of the term of this patent subsequent to Jan. 13, 1987, has been disclaimed.

[22] Filed: Sept. 18, 1970

[21] Appl. No.: 73,682

Related U.S. Application Data

[63] Continuation of Ser. No. 876,198, Dec. 2, 1969, abandoned, which is a continuation of Ser. No. 642,325, May 31, 1967, abandoned, which is a continuation-in-part of Ser. No. 434,677, Feb. 23, 1965, abandoned.

[30] Foreign Application Priority Data

Feb. 25, 1964 Italy .................................. 4141/64
June 1, 1966 Italy ................................ 18570/66

[52] U.S. Cl. .......................... 260/79.5 B; 526/169; 526/282

[51] Int. Cl.² ..................... C08F 27/06; C08D 1/14; C08D 3/04
[58] Field of Search .......... 260/79.5 B, 80.7, 80.78, 260/88.2, 94.9 C, 79.5 A, 79.5 R; 526/169, 282

[56] References Cited

UNITED STATES PATENTS

| 3,093,620 | 6/1963 | Gladding | 260/79.5 B |
|---|---|---|---|
| 3,093,621 | 6/1963 | Gladding | 260/80.5 |
| 3,151,173 | 9/1964 | Nyce | 260/666 |
| 3,260,708 | 7/1966 | Natta | 260/79.5 |
| 3,340,240 | 9/1967 | Natta | 260/88.2 |
| 3,489,733 | 6/1970 | Natta | 260/80.78 |
| 3,574,176 | 4/1971 | Boozer | 260/80.78 |

*Primary Examiner*—Christopher A. Henderson, Jr.

[57] ABSTRACT

There is disclosed a new class of substantially linear, amorphous, unsaturated, vulcanizable, high molecular weight copolymers of ethylene, a higher alpha-olefin of the formula $CH_2 = CHR$ in which R is an alkyl group containing from 1 to 6 carbon atoms and certain specific omega-alkenyl derivatives of norbornene in which the double bond of the alkenyl group is non-vinyl and occurs at either end of said group. A process for the preparation of the new copolymers by the use of catalysts acting according to an anionic coordinate mechanism is also disclosed.

3 Claims, No Drawings

ETHYLENE-OLEFIN-ALKENYL NORBORNENE ELASTOMERS

This application is a continuation of Ser. No. 876,198 filed Dec. 2, 1969, now abandoned, which in turn is a continuation of Ser. No. 642,325 filed May 31, 1967, now abandoned, which in turn is a continuation-in-part of Ser. No. 434,677 filed Feb. 23, 1965, now abandoned.

The preparation of amorphous, unsaturated copolymers obtained by copolymerization of one or more olefin monomers selected in particular from ethylene and higher alpha-olefins with conjugated, non-conjugated, linear or cyclic dienes and polyenes has been described. In particular, the preparation has been described of amorphous unsaturated copolymers of one or more monoolefin monomers with alkenycycloalkenes, polyalkenycycloalkanes, omega-alkenylpolycycloalkenes, in which the alkenyl is of the vinyl type or with 5-alkenyl-2-norbornenes in which the double bond of the alkenyl is internal.

Each of the monomeric units deriving from the polymerization of dienes and polyenes belonging to the above mentioned classes retains one or more free unsaturations in the polymeric chain of the copolymers and thus said copolymers are vulcanizable with the aid of mixes based on sulfur, of the type of those generally used for the vulcanization of the unsaturated rubbers and can be transformed into products having good elastomeric properties.

It has now been found, according to the present invention, that by use of particular catalysts acting with an anionic coordinate mechanism, it is possible to prepare an entirely new clas of amorphous, unsaturated copolymers not previously disclosed and which are capable of being vulcanized to elastomers having good mechanical characteristics.

More particularly, it has been found that by using catalysts prepared from vanadium compounds and organometallic compounds or hydrides of aluminum, beryllium or lithium-aluminum, it is possible to obtain linear, amorphous, high molecular weight copolymers of one or more monomers selected from omega-alkenyl derivatives of norbornene in which the double bond of the alkenyl group is non-vinyl, with ethylene and one or more aliphatic alpha-olefins having the general formula R—CH=CH$_2$, in which R is an alkyl group containing from 1 to 6 carbon atoms, which copolymers consist of macromolecules containing unsaturations and made up of units deriving from each of the monomers used in the starting copolymerization mixture. The term "omega" as used herein indicates the presence of the double bond at either end of the alkenyl group.

In practice it has been found that in order to obtain the best results it is necessary to use catalysts prepared from components as aforesaid and containing halogen atoms, that is catalysts at least one of the components of which contains halogen.

It is known that the compounds containing a non-vinyl double bond, for instance compounds containing the group

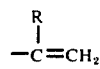

in which R is an alkyl group tend to polymerize by a cationic mechanism in the presence of metal halides. Since the catalysts which can be used in the process according to the present invention must contain halogen atoms, it could be expected that at least some of the omega-alkenyl derivatives of norbornene which are used in preparing the copolymers of the present invention would polymerize by a cationic mechanism and would not copolymerize with the alpha-olefins. On the contrary, it has been found that by working under the conditions of the process according to the present invention, which conditions are discussed in more detail hereinbelow, the non-vinyl group in the omega position remains inactive and cationic homopolymers are not formed, whereas copolymers of the omega-alkenyl derivatives of norbornene with ethylene and the aliphatic olefins are obtained.

The omega-alkenyl derivatives of norbornene used in preparing the copolymers of this invention have the general formula

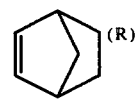

wherein (R) is selected from the omega-alkenyl groups of the formula

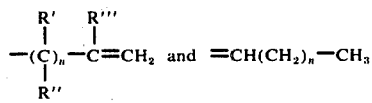

in which $n$ can vary from 0 to 6, R''' is an alkyl group containing preferably from 1 to 6 carbon atoms, and R' and R'' may be the same or different and represent either hydrogen atoms, alkyl groups preferably containing from 1 to 6 carbon atoms, or cycloalkyl groups preferably containing no more than 10 carbon atoms.

Processes for the preparation of these omega-alkenyl norbornene derivatives are known.

Non-limitative examples of the useful alkenyl-substituted norbornenes having a non-vinyl double bond at one end of the alkenyl group include:
2-isopropenyl-norbornene-5;
2-methallyl-norbornene-5;
2(3'-methyl-butene-3'-yl)norbornene-5;
2-(4'-methyl-pentene-4'yl)norbornene-5;
5-ethylidene-norbornene-2;
5-butylidene-norbornene-2;
5-pentylidene-norbornene-2; etc.

The olefins which may be used in the preparation of the copolymers according to the present invention consist of ethylene and alpha-olefins having the general formula R—CH=CH$_2$ in which R is an alkyl group containing from 1 to 6 carbon atoms, in particular propylene and butene-1.

For instance, by copolymerizing ethylene, propylene and 2-methallyl-norbornene-5 under the conditions disclosed hereinbelow, a terpolymer containing randomly distributed polymerized units of each of the starting monomers, and which is sulfur-vulcanizable is obtained.

Likewise, by copolymerizing ethylene, propylene and 5-ethylidene-norbornene-2 under the same conditions, there is also obtained a sulfur-vulcanizable terpolymer consisting of macromolecules containing randomly distributed polymerized units of ethylene, propylene and 5-ethylidene-norbornene-2.

Examination of the new terpolymers by infrared spectrography shows the presence of unsaturations therein.

Said terpolymers are very homogeneous as demonstrated by the possibility of obtaining good vulcanizates using the techniques generally used for the vulcanization of the unsaturated rubbers, particularly the low-unsaturation rubbers, such as e.g., butyl rubber.

The double bonds contained in the copolymers according to the present invention can be used for the vulcanization and furthermore, for instance after oxidation with ozone, can give rise to polar groups such as e.g., carboxylic groups, which in turn can be used as reactive groups for subsequent reactions and can be utilized for improving the adhesivity of the copolymers.

The double bonds can also be utilized for addition reactions with metal hydrides e.g., LiH, NaBH$_4$, AlH(C$_4$H$_9$)$_2$ etc. The metal-to-carbon bonds thus formed can also be used for further reactions.

The copolymers according to the present invention can be defined as having a substantially linear structure, that is the copolymers are free of long branches. This is demonstrated by the fact that they have properties (such as, more particularly, a viscous behavior) practically identical with those of known linear copolymers, e.g., linear ethylene/higher alpha-olefin copolymers.

The new copolymers herein described have a molecular weight determined viscosimetrically, higher than 20,000. In fact, the intrinsic viscosity, determined in tetrahydronaphthalene at 135° C or in toluene at 30° C, is higher than 0.5.

The vulcanized products are wholly insoluble in the organic solvents, such as aliphatic hydrocarbons, and are swollen only to a limited extent by some aromatic solvents, in contrast to the copolymers as such, which are completely soluble in boiling n-heptane.

The vulcanized products have, furthermore, very good mechanical strength and low permanent set at break.

In particular, the vulcanizates have high reversible elastic elongations and, particularly when reinforcing fillers such as carbon black are employed in the vulcanization mix, also show high tensile strengths.

The non-vulcanized copolymers have the properties of non-vulcanized elastomers since they have a low initial modulus and a very high elongation at break. Due to the excellent mechanical characteristics thereof, the vulcanized elastomers can be used advantageously in all of the applications in which natural and synthetic rubbers are useful. For instance, these new vulcanized elastomers can be used successfully in the preparation of pipes, tire tubes, tires, foils, elastic yarns, gaskets, etc.

The copolymers according to the present invention can be extended or plasticized with hydrocarbon oils. Paraffinic or naphthenic oils are preferably used but aromatic oils can also be used.

The catalytic systems which may be used in the preparation of the copolymers according to the present invention are highly dispersible, amorphous colloidally dispersible, or wholly soluble in the hydrocarbons which may be employed as copolymerization solvents, as for instance, aliphatic, cycloaliphatic or aromatic hydrocarbons or mixtures thereof and are prepared from organometallic compounds or hydrides of aluminum, beryllium or lithium aluminum and from vanadium compounds.

More particularly, the following classes of organometallic compounds and hydrides can be used for the preparation of the catalyst: Aluminum trialkyls, aluminum alkylhydrides, lithium-aluminum tetraalkyls, aluminum halohydrides, lithium-aluminum hydride, lithium-aluminum alkyl hydrides, aluminum dialkylmonohalides, aluminum-monoalkyl dihalides, aluminum alkylsesquihalides, aluminum alkenyls, aluminum alkylenes, aluminum cycloalkyls, aluminum cycloalkylalkyls, aluminum aryls, aluminum alklaryls, aluminum dialkylalkoxides, aluminum alkylalkoxyhalides, or complexes of the above mentioned aluminum organic compounds with preferably weak Lewis bases, beryllium dialkyls, beryllium alkylhalides and beryllium diaryls.

Non-restrictive examples of the useful organometallic compounds are: aluminum triethyl, aluminum triisobutyl, lithium-aluminum tetrahexyl, lithium aluminum dibutyldihydride, aluminum diethylhydride, aluminum monoethyldihydride, aluminum chlorohydrides, aluminum trihexyl, aluminum diethylmonofluoride, aluminum diisobutylmonochloride, aluminum monoethyldichloride, aluminum ethylsesquichloride, aluminum butenyldiethyl, aluminum isohexenyldiethyl, 2-methyl-1,4 (diisobutyl aluminum) butane, aluminum tri (cyclopentylmethyl), aluminum tri (dimethylcyclopentylmethyl), aluminum triphenyl, aluminum tritolyl, aluminum di(cyclopentylmethyl) monochloride, aluminum diphenylmonochloride, aluminum diisobutyl monochloride complexed with anisole, aluminum monochloromonoethylmonoethoxide, aluminum diethylpropoxide, aluminum diethylamyloxide, aluminum monochloromonopropylmonopropoxide, aluminum monochloromonopropylmonoethoxide, beryllium diethyl, beryllium methylchloride, beryllium dimethyl, beryllium di-n-propyl, beryllium diisopropyl, beryllium di-n-butyl, beryllium di-tert. butyl, beryllium diphenyl.

In preparing the catalyst, the aforementioned metallorganic compounds and hydrides are mixed with vanadium compounds.

Preferably, the vanadium compounds used are those which are soluble in hydrocarbons, such as halides and oxyhalides (e.g., VCl$_4$, VOCl$_3$, VBr$_4$) and vanadium compounds wherein at least one of the metal valences is saturated by a heteroatom (in particular oxygen or nitrogen) linked to an organic group such as e.g. vanadium triacetylacetonate and tribenzoylacetonate, vanadyl di-acetylacetonate and haloacetylacetonates and vanadyl trialcoxides and haloalkoxides, tetrahydrofuranates, etherates, aminates, pyridinates and quinolinates of vanadium tri- and tetrachloride and of vanadyl trichloride.

Hydrocarbon-insoluble vanadium compounds selected from the organic salts such as e.g., vanadium triacetate, tribenzoate and tristearate may also be used.

As noted hereinabove, in order to obtain optimum results, it is necessary in practice to use halogen-containing catalytic systems in which at least one of the catalyst-forming components contains halogen.

The copolymerization may be carried out at temperatures between −80° and +125° C.

When the catalyst employed is prepared from vanadium triacetylacetonate, vanadyl diacetylacetonate, vanadyl haloacetylacetonates, or in general from a vanadium compound (such as, in addition to those already mentioned, VCl$_4$ or VOCl$_3$) in the presence of aluminum alkylhalides, it is convenient to carry out both the catalyst preparation and the copolymerization at temperatures in the range between 0° and −80° C, preferably between −10° and −50° C, in order to obtain high copolymer productions per weight unit of the catalyst used.

When operating under said conditions, the catalysts display an activity much higher than that of the same catalytic systems prepared at higher temperatures. Moreover, when operating within the above-indicated range of low temperatures, the activity of the catalysts remains practically unchanged with time. At the low temperature the catalysts have, moreover, a higher activity.

When the catalyst is prepared from an aluminum alkyl halide and vanadium triacetylacetonate, vanadyl trialkoxides, or vanadyl haloalkoxides at temperatures comprised between 0° and 125° C, it is advantageous to operate in the presence of particular complexing agents selected from ethers, thioethers, tertiary amines of trisubstituted phosphines containing at least one branched alkyl group or an aromatic nucleus, in order to obtain high copolymer yields.

The complexing agent may be an ether having the formula RYR' in which Y is oxygen or sulfur and R and R' are linear or branched alkyl groups containing from 1 to 14 carbon atoms or an aromatic nucleus containing from 1 to 14 carbon atoms at least one of R and R' being a branched alkyl group or an aromatic nucleus.

The complexing agent may be a tertiary amine having the formula:

in which R, R' and R" each represents an alkyl radical containing from 1 to 14 carbon atoms or an aromatic nucleus containing from 6 to 14 carbon atoms, at least one of R, R' or R" being an aromatic nucleus.

The complexing agent may also be a tertiary phosphine having the formula:

in which R, R' and R" are each an alkyl radical containing from 1 to 14 carbon atoms or an aromatic nucleus containing from 6 to 14 carbon atoms, at least one of these R being an aromatic nucleus.

The amount of the complexing agent is preferably comprised between 0.05 and 1 mole of aluminum alkylhalide.

The activity of the catalyst employed in the herein described process varies with the molar ratio between the compounds employed in the catalyst preparation.

For instance, we have found that if aluminum trialkyls and vanadium halides or oxyhalides are used, catalysts in which the molar ratio of aluminum trialkyl to vanadium compound is between 1 and 5, preferably between 2 and 4, are conveniently used.

If, on the contrary, aluminum diethylmonochloride [$Al(C_2H_5)_2Cl$] and vanadium triacetylacetonate ($VAc_3$) are used, the best results are obtained with an $Al(C_2H_5)_2Cl/VAc_3$ molar ratio between 2 and 20 preferably between 4 and 10.

The copolymerization may be carried out in the presence of an aliphatic, cycloaliphatic or aromatic hydrocarbon solvent, such as e.g., butane, pentane, n-heptane, toluene, xylene or mixtures thereof.

Halogenated hydrocarbons which are inert to the catalyst, such as e.g., chlorobenzenes, trichloroethylene, tetrachloroethylene, chloroform, methylene chloride, dichloroethane, etc., can also be used as solvents.

Particularly high copolymerization rates may be obtained if the copolymerization is carried out in the absence of an inert solvent by using the monomers in the liquid state, namely in a solution of ethylene in the mixture of alpha-olefins and of omega-alkenyl norbornene to be copolymerized, kept in the liquid state.

The fact that the non-vinyl double bond present at one or the other end of the alkenyl group in the substituted norbornenes which are used as comonomers cannot be polymerized by using the catalysts above described has the very important practical result that the products obtained by working in absence of inert solvents are free of cross-linkings. This is in marked contrast to the results obtained when ethylene, and higher alpha-olefins and alkenylnorbornenes containing a vinyl group are copolymerized in the absence of inert solvents.

In order to obtain copolymers having a high homogeneity of composition, the ratio between the concentrations of the monomers to be copolymerized, present in the liquid reacting phase, should conveniently be kept constant or at least as constant as possible during the copolymerization.

To this end it may be convenient to carry out the copolymerization continuously by continuously feeding and discharging a mixture of monomers of constant composition and operating with high flow rates.

By varying the composition of the monomers, the composition of the copolymers may be varied within wide limits.

If one wants to obtain amorphous copolymers of the omegaalkenyl norbornenes as disclosed herein, with ethylene and propylene, a molar ratio between ethylene and propylene of at most 1:4 or lower should be maintained in the liquid reacting phase. This corresponds to an ethylene-propylene molar ratio in the gaseous phase under normal conditions of at most 1:1, or lower. The amount of propylene in moles present in the liquid reacting phase must be at least four times the amount of ethylene, in moles, present therein, for amourphous copolymers to be produced.

Molar ratios between 1:200 and 1:4 in the liquid phase are usually preferred.

When butene-1 is employed instead of propylene, the ratio between ethylene and butene in the liquid phase must be at most 1:20 or lower, corresponding to a molar ratio between ethylene and butene-1 in the gaseous phase of at most 1:1.5 or lower under normal conditions. The amount of butene-1 in moles in the reacting liquid phase must be at least twenty times the amount of ethylene, in moles, therein, for the preparation of amorphous copolymers.

Molar ratios, in the liquid phase, between 1:1,000 and 1:20 are usually preferred.

By operating under these conditions, amorphous terpolymers containing less than about 75% by moles of ethylene are obtained. If these values are exceeded, the terpolymer shows a crystallinity of the polyethylenic type.

The lower limit of the ethylene content is not critical; it is however, preferred that the terpolymers contain at least 5% by moles of ehtylene.

The alpha-olefin content usually ranges from a minimum of 5% to a maximum of 95% by moles.

The diene or polyene content of the terpolymer is preferably between 0.1 and 20%. This upper limit can be raised, but more particularly for economical reasons, it is not convenient to introduce into the copolymer a polyene content higher than 20% by moles.

The following examples are given to illustrate the invention.

EXAMPLE 1

The reaction apparatus consists of a glass cylinder having a capacity of 750 cc and a diameter of 5.5 cm, provided with a stirrer and inlet and outlet tubes for the gases. The gas inlet tube extends to the bottom of the cylinder and terminates in a porous diaphragm (diameter 3.5 cm).

200 cc of anhydrous n-heptane and 1 cc of 2-methy-allyl-norbornene-5 are introduced into the reactor immersed in a thermostatic bath at −20° C. Through the gas inlet tube a gaseous ethylene-propylene mixture in the molar ratio 1:2 is introduced and circulated at a rate of 300 Nl/h.

The catalyst is formed in a 100 cc flask, by working at −20° C, under nitrogen, by reacting 1 millimol of $VOCl_3$ and 5 millimoles of aluminum diethylmonochloride in 30 cc of anhydrous n-heptane.

The catalyst thus formed is siphoned into the reactor by means of nitrogen pressure.

Feeding and discharging of the ethylene-propylene mixture is continued at the rate of 300 Nl/h.

After 5 minutes from the beginning of the reaction, it is interrupted by adding 20 cc of methanol containing 0.1 g of phenyl-beta-naphthylamine.

The product is purified in a separating funnel under nitrogen, by repeated treatments with aqueous hydrochloric acid and then with water, and is coagulated with acetone.

After drying under vaccum, 10.5 g of a solid product are obtained, which appears to be amourphous under X-ray examination, looks like an unvulcanized elastomer and is completely soluble in boiling n-heptane.

The infrared spectrographic examination shows the presence of vinylidene groups (band at 11.2 microns). The ethylene/propylene molar ratio is about 1:1.

100 parts by weight of the terpolymer are mixed on a laboratory roll mixer with one part of phenyl-beta-naphthylamine, 2 parts of sulfur, 5 parts of zinc oxide, 50 parts of carbon black HAF, 1 part of tetramethylthiouramedisulphide and 0.5 parts of mercaptobenzothiazole.

The mixture is vulcanized in a press at 150° C for 60 minutes. A vulcanized lamina having the following characteristics is obtained:

| tensile strength | 153 kg/cm$^2$ |
| elongation at break | 340% |
| modulus at 300% | 136 kg/cm$^2$ |

EXAMPLE 2

Into reaction apparatus as described in Example 1 and kept at the constant temperature of −20° C, there are introduced 200 cc of anhydrous n-heptane and 1 cc of 2-isopropenyl-norbornene-5. An ethylene/propylene mixture in the molar ratio 1:2 is introduced through the gas inlet tube and circulated at a rate of 300 Nl/h.

The catalyst is pre-formed in a 100 cc flask working at −20° C under nitrogen, by reacting in 30 cc of anhydrous n-heptane, 0.5 millimoles of vanadium tetrachloride and 2.5 millimoles of aluminum ethylsesquichloride [1/2 $Al_2$ $(C_5)_3Cl_3$] and is siphoned into the reactor by means of nitrogen pressure.

The ethylene/propylene mixture is continuously fed and discharged at a rate of 300 Nl/h.

The reaction is stopped after 3 minutes by adding 10 cc of methanol containing 0.1 g of phenyl-beta-naphtylamine.

The product is purified and separated as described in Example 1. After drying under vacuum, there are obtained 7 g of solid terpolymer which is amorphous under X-ray examination, looks like a non-vulcanized elastomer and is completely soluble in boiling n-heptane.

The infrared spectroraphic examination shows the presence of vinylidene groups (band at 11.2 microns).

The molar ratio ethylene/propylene is about 1:1. The terpolymer is vulcanized using the same mix and the same modalities described in Example 1, to obtain a vulcanized lamina having the following characteristics:

| tensile strength | 175 kg/cm$^2$ |
| elongation at break | 430% |
| modulus at 300% | 156 kg/cm$^2$ |

EXAMPLE 3

Into reaction apparatus as described in Example 1, and kept at −20° C, there are introduced 200 cc of anhydrous n-heptane and 1 cc of 2-(3'-methyl-buten-3'-yl) norbornene-5.

An ethylene/propylene mixture in the molar ratio of 1:3 is introduced through the gas inlet tube and circulated at a rate of 300 Nl/h.

The catalyst is preformed in a 100 cc flask by working at −20° C under nitrogen and reacting 0.5 millimoles of $VOCl_3$ and 2.5 millimoles of diethyl aluminum monochloride in 30 cc of anhydrous n-heptane.

The catalyst thus preformed is siphoned into the reactor by nitrogen pressure.

The gaseous mixture is continuously fed and discharged at a rate of 300 Nl/h. After 9 minutes, the reaction is stopped by adding 10 cc of methanol containing 0.1 g of phenyl-beta-naphthylamine.

The product is purified and separated as described in Example 1.

After drying under vacuum, there are obtained 6.5 g of solid terpolymer which is amorphous at X-ray examination, looks like a non-vulcanized elastomer and is completely soluble in boiling n-heptane. The infrared spectrographic examination shows the presence of vinylidene groups (band at 11.2 microns).

The molar ratio between ethylene and propylene is about 1:1. The terpolymer is vulcanized using the same mix and the modalities described in Example 1.

A vulcanized lamina is obtained having the following characteristics:

| tensile strength | 180 kg/cm$^2$ |
| elongation at break | 360% |

| -continued | |
|---|---|
| modulus at 300% | 142 kg/cm² |

EXAMPLE 4

The reaction apparatus used is similar to that described in Example 1, but has a diameter of 7.5 cm and a capacity of 1200 cc.

Into the apparatus kept at the constant temperature of −20° C, 700 cc of anhydrous n-heptane and 3.5 cc of 2-methallyl-norbornene-5 are introduced.

Through a gas inlet tube an ethylene/propylene mixture having an ethylene/propylene molar ratio of 1:3 is introduced and circulated at the rate of 600 Nl/h.

In a 100 cc flask the catalyst is preformed working at −20° C under nitrogen and reacting 1 millimol of vanadium oxytrichloride with 5 millimoles of aluminum ethylsesquichloride [½Al₂(C₂H₅)₃Cl₃] in 40 cc of anhydrous n-heptane.

The catalyst thus preformed is siphoned into the reactor by means of nitrogen pressure. The ethylene/propylene mixture is continuously fed and discharged at a rate of 600 Nl/h.

After 18 minutes the reaction is stopped by adding 10 cc of methanol containing 0.1 g of phenyl-beta-naphthylamine. The product is purified and separated as described in Example 1.

After drying under vacuum, a solid terpolymer weighing 30 g is obtained. It is amorphous at X-ray examination, looks like a non-vulcanized elastomer and is completely soluble in boiling n-heptane.

The infrared spectrographic examination shows the presence of vinylidene groups (band at 11.2 microns). The molar ratio ethylene/propylene is about 1:1. The Mooney viscosity ML (1 +4) measured at 100° C, is 147. The intrinsic viscosity measured in toluene at 30° C is 2.8 dl/g.

70 parts of the terpolymer are mixed in a laboratory roll mixer with 30 parts of Circosol 2XH [naphthenic oil having a specific density 0.9230 and Saybolt viscosity at 100° F (about 38° C) of 83 seconds]. 50 parts of carbon black HAF, 1 part of phenyl-beta-naphlamine, 1 part of stearic acid, 1 part of zinc oxide, 0.5 parts of mercaptobenzothiazole, 1 part of tetramethylthiuram disulphide and 2 parts of sulfur.

The vulcanization carried out at 150° C and by successive steps gives the results reported in the following table.

| Vulcanization time minutes | Tensile strength kg/cm² | Elongation at break % | Modulus 200% kg/cm² | Modulus 300% kg/cm² | Permanent set % |
|---|---|---|---|---|---|
| 15 | 182 | 520 | 52 | 91 | 8 |
| 30 | 180 | 410 | 68 | 126 | 8 |
| 60 | 171 | 340 | 91 | 156 | 8 |
| 90 | 180 | 310 | 91 | 172 | 7.5 |
| 120 | 175 | 300 | 100 | 175 | 7.5 |
| 240 | 155 | 280 | 93 | — | 7.5 |

EXAMPLE 5

Into reaction apparatus as described in Example 4, and kept at the constant temperature of −20° C, 700 cc of anhydrous n-heptane and 3 cc of 2-methallyl norbornene-5 are introduced. Through the gas inlet tube an ethylene/propylene mixture is introduced in the molar ratio of 1:2 and is circulated at a rate of 450 Nl/h.

In a 100 cc flask the catalyst is preformed working at −20° C and reacting 1 millimol of vanadium tetrachloride and 5 millimoles of aluminum ethylsesquichloride [½Al₂(C₂H₅)₃Cl]. The catalyst thus preformed is siphoned into the reactor by means of a nitrogen pressure.

The ethylene/propylene mixture is continuosly fed and discharged at a rate of 450 Nl/h. After 15 minutes the reaction is stopped by adding 10 cc of methanol containing 0.1 g of phenyl-beta-naphthylamine.

The product is purified and separated as described in Example 1. After drying under vacuum 29.6 g of solid terpolymer are obtained. It is amorphous under X-rays, has the appearance of a non-vulcanized elastomer and is completely soluble in boiling n-heptane.

The infrared spectroraphic examination shows the presence of vinylidene groups (band at 11.2 microns). The ethylene/propylene molar ratio is about 1:1. The Mooney viscosity ML (1 + 4) measured at 100° C is 132.

The vulcanization of the terpolymer, carried out with the same mix and the same modalities as described in Example 4, gives the results reported in the following table:

| Vulcanization time minutes | Tensile strength kg/cm² | Elongation at break % | Modulus at 200% kg/cm² | Modulus at 300% kg/cm² | Permanent set % |
|---|---|---|---|---|---|
| 15 | 180 | 700 | 33 | 62 | 14 |
| 30 | 174 | 500 | 54 | 94 | 10 |
| 60 | 164 | 420 | 68 | 118 | 9 |
| 90 | 156 | 340 | 80 | 138 | 9 |
| 120 | 156 | 340 | 76 | 138 | 8 |
| 240 | 167 | 340 | 77 | 143 | 7 |

EXAMPLE 6

Into reaction apparatus as described in Example 4, and kept at the constant temperature of +25° C, there are introduced 1,000 cc of anhydrous n-heptane and 2.5 cc of 2-methallyl norbornene-5.

Through the gas inlet tube, a gaseous ethylene/propylene mixture in the molar ratio of 1:3 is introduced and circulated at a rate of 200 Nl/h.

The catalyst is preformed at +25° C under nitrogen, by reacting 2 millimoles of vanadium oxytrichloride in a 100 cc flask and 10 millimoles of aluminum dichloromonoethyl in 40 cc of anhydrous n-heptane.

The catalyst thus preformed is siphoned into the reactor by means of nitrogen pressure. The ethylene/propylene mixture is continuously fed and discharged at a rate of 200 Nl/h.

50 minutes after starting of the reaction it is stopped by adding 10 cc of methanol containing 0.1 g of phenyl-beta-naphthylamine.

The product is purified and separated as described in Example 1. After drying under vacuum, 19.9 g of solid terpolymer are obtained. It is amorphous at the X-rays, looks like a non-vulcanized elastomer, and is completely soluble in boiling n-heptane.

The infrared spectrographic examination of the terpolymer shows the presence of vinylidene groups (band at 11.2 microns). The ethylene/propylene molar ratio is about 1.2:1. The Mooney viscosity ML(1+4) measured at 100° C is 92.

The vulcanization of the terpolymer, carried out using the same mix and modalities as in Example 4, gives the results reported in the following table:

| Vulcanization time minutes | Tensile strength kg/cm² | Elongation at break % | Modulus at 200% kg/cm² | Modulus at 300% kg/cm² | Permanent set % |
|---|---|---|---|---|---|
| 15 | 83 | 530 | 31 | 52 | 20 |
| 30 | 114 | 440 | 49 | 78 | 16 |
| 60 | 132 | 400 | 62 | 104 | 10 |
| 90 | 128 | 360 | 61 | 104 | 8 |
| 120 | 132 | 340 | 70 | 114 | 8 |
| 240 | 120 | 320 | 66 | 112 | 8 |

EXAMPLE 7

Into reaction apparatus as described in Example 1, kept at the constant temperature of −20° C, 200 cc of anhydrous n-heptane and 1 cc of 2-methallyl norbornene-5 are introduced. Through the gas inlet tube an ethylene/propylene mixture in the molar ratio of 1:2 is introduced and circulated at a rate of 200 Nl/h.

The catalyst is preformed in a 100 cc flask, at −20° C under nitrogen, by reacting 0.5 millimoles of vanadium tetrachloride and 1.25 millimoles of beryllium diethyl in 30 cc of anhydrous n-heptane.

The catalyst thus preformed is siphoned into the reactor by means of a nitrogen pressure. The gaseous mixture is continuously fed and discharged at a rate of 300 l Nl/h.

After 15 minutes, the reaction is stopped by adding 10 cc of methanol containing 0.1 g of phenyl-beta-naphthylamine. The product is purified and separated as described in Example 1.

After drying, there are obtained 5 g of solid terpolymer which is amorphous at the X-rays, looks like a non-vulcanized elastomer, and is completely soluble in boiling n-heptane.

The infrared spectrographic examination of this terpolymer shows the presence of vinylidene groups (band at 11.2 microns). The molar ratio ethylene/propylene is about 1:1. When the terpolymer is vulcanized with the same mix and the same modalities described in Example 1, a vulcanized sheet having the following characteristics is obtained:

| tensile strength | 160 kg/cm² |
|---|---|
| elongation at break | 440% |
| modulus at 300% | 123 kg/cm² |

EXAMPLE 8

Into reaction apparatus as described in Example 1 and kept at the constant temperature of −10° C there are introduced 200 cc of anhydrous n-heptane and 1 cc of 2-methallyl norbornene-5. An ethylene/butene-1 mixture in the molar ratio of 1:4 is introduced through the gas inlet tube and circulated at a rate of 200 Nl/h. The catalyst is preformed in a 100 cc flask at −10° C under nitrogen by reacting 0.5 millimoles of vanadium oxytrichloride and 2.5 millimoles of aluminum ethylsesquichloride [½Al₂(C₂H₅)₃Cl₃] in 30 cc of anhydrous n-heptane, and is siphoned into the reactor by means of a nitrogen pressure. The ethylene/butene mixture is continuously circulated at a rate of 200 Nl/h.

After 6 l minutes, the reaction is stopped by adding 10cc of methanol containing 0.1 of phenyl-beta-naphthylamine. The product is purified and separated as described in Example 1.

After vacuum drying, there are obtained 4.5 g of solid terpolymer which is amorphous at the X-rays, looks like a non-vulcanized elastomer, and is completely soluble in boiling n-heptane. The infrared spectrographic examination of this terpolymer shows the presence of vinylidene groups (band at 11.2 microns), of ethyl groups (band at 13 microns) and of methylene sequences having different length (zone between 13 and 14 microns).

The vulcanization is carried out using the same mix and the same modalities as in Example 1.

| tensile strength | 175 kg/cm² |
|---|---|
| elongation at break | 450% |
| modulus at 300% | 115 kg/cm² |

EXAMPLE 9

Into a 6 liter stainless-steel autoclave provided with a comb stirred and pipe discharging from the bottom, and cooled by means of liquid ammonia circulating in a jacket, there are introduced 4 liters of liquid propylene and 40 cc or 2-methallyl-norbornene-5.

The temperature is brought to −10° C and then the solution is saturated with ethylene until the pressure reaches 4 atm.

0.96 g of Al(C₂H₅)₂ Cl in heptane solution (10 g of Al(C₂H₅)₂Cl in 100 cc heptane) and then 0.36 g of vanadium triacetylacetonate in toluene solution (5 g of vanadium triacetylacetonate in 100 cc toluene) are introduced. The temperature is kept constant at −10° C and the pressure at 4 atm. by feeding again the ethylene absorbed during the reaction.

After 60 minutes the autoclave is discharged from the bottom, the propylene which has not reacted is removed by steam and the polymer containing (4-ethyl-6-tert. butylphenol) is dried in a colander.

360 g of terpolymer soluble in boiling CCl₄ are obtained. The infrared spectrographic examination shows the presence of vinylidene groups (band at 11.2 microns). The propylene content is 55% by weight.

The terpolymer is vulcanized with the mix and the modalities of Example 1. A vulcanized sheet is obtained having the following characteristics:

| tensile strength | 205 kg/cm² |
|---|---|
| elongation at break | 410% |
| modulus at 300% | 157 kg/cm² |

EXAMPLE 10

The reaction apparatus consists of a glass cylinder having a diameter of 10 cm and a volume of 3,500 cc, provided with stirrer and inlet and outlet tubes for the gases.

The gas inlet tube reaches the bottom of the vessel and ends in a porous diaphragm (diameter 5 cm).

2000 cc of anhydrous n-heptane, 1.5 cc of b 5-ethylidene-norborene-2 and 0.135 millimoles of zinc diethyl are introduced into the apparatus which is kept at the constant temperature of −20° C. A propylene/ethylene mixture in the molar ratio 3:1 is introduced through the gas inlet tube and circulated at the rate of 1200 Nl/h. The catalyst is prepared in the presence of the reacting monomers by separately introducing into the reactor a solution of 3.75 millimoles of aluminum diethyl monochloride in 15 l cc of n-heptane and 0.5 millimoles of vanadium triacetylacetonate dissolved in 15 cc of anhydrous toluene.

The propylene/ethylene mixture is continuously fed and discharged at a rate of 1200 Nl/h. 17 minutes after the introduction of the catalyst, the reaction is stopped by adding 10 cc of methanol containing 0.1 g of phenyl-beta-naphthylamine. The product is purified in a separatory funnel by means of repeated washings with diluted hydrochloric acid and then with water and is then coagulated in acetone.

After vacuum drying, 41 g of a solid product which is amorphous at the X-rays, looks like a non-vulcanized elastomer and is completely soluble in boiling n-heptane are obtained. Infrared spectrographic examination shows the presence of unsaturations (band between 6 and 6.2 cm). The propylene content is 55% by weight. The Mooney viscosity ML (1 + 4) at 100° C is 96.

100 parts by weight of terpolymer are mixed, on a laboratory roll mixer, with 50 parts of HAF black, one part of phenyl-beta-naphthylamine, 2 parts of sulfur, 5 parts of zinc oxide, 1 part of tetramethylthiuramedisulphide and 0.5 parts of mercaptobenzothiazole. The mix is vulcanized in a press for 60 minutes at 150° C.

A vulcanized lamina having the following characteristics is obtained:

| | |
|---|---|
| tensile strength | 205 kg/cm$^2$ |
| elongation at break | 440% |
| modulus at 200% | 63 kg/cm$^2$ |
| modulus at 300% | 117 kg/cm$^2$ |
| permanent set at break | 10% |

EXAMPLE 11

2000 cc of anhydrous n-heptane, 1.5 cc of 5-ethylidene-norbor-nene-2 and 0.125 millimoles of zinc diethyl are introduced into the same reaction apparatus described in Example 10, kept at the temperature of −20° C. A propylene/ethylene mixture in the molar ratio 3:1 is introduced through the gas inlet tube and circulated at the rate of 1200 Nl/h.

The catalyst is prepared in the presence of the monomers by separately introducing into the reactor a solution of 3.8 millimoles of aluminum diethyl monochloride in 15 cc of anhydrous n-heptane and a solution of 0.5 millimoles of vanadium oxytrichloride in 15 cm$^3$ of n-heptane. The propylene/ethylene mixture is continuously introduced and discharged at a rate of 1200 Nl/h.

17 minutes after the introduction of the catalyst the reaction is stopped by adding 10 cc of methanol containing 0.1 g of phenyl-beta-naphthylamine.

The product is purified and isolated as described in Example 10. After vacuum drying, 20 g of a solid product are obtained which are amorphous at the X-rays, looks like a non-vulcanized elastomer and is completely soluble in boiling n-heptane.

Infrared spectrographic examination shows the presence of unsaturations (band between 6 and 6.2 microns).

The propylene content is 42% by weight.

The Mooney viscosity ML (1 + 4) at 100° C is 93.

100 parts by weight of the terpolymer are vulcanized with the same mix of Example 10 and for different times. The properties of the vulcanizates are given in the following table:

| Vulcanization time minutes | Tensile strength kg/cm$^2$ | Elongation at break % | Modulus at 200% kg/cm$^2$ | Modulus at 300% kg/cm$^2$ | Permanent set % |
|---|---|---|---|---|---|
| 30 | 240 | 380 | 90 | 180 | 10 |
| 60 | 220 | 340 | 95 | 190 | 6 |
| 90 | 205 | 290 | 112 | — | 6 |
| 120 | 225 | 300 | 108 | 225 | 6 |
| 240 | 227 | 320 | 107 | 208 | 6 |

EXAMPLE 12

The reaction apparatus is a glass autoclave having a volume of 1 liter, provided with stirrer and inlet tube for the gases.

500 cc of liquid propylene, 5 cc of 5-ethylidene-norbornene-2 and 0.125 millimoles of zinc diethyl are introduced into the autoclave which is kept at −20° C.

Ethylene is introduced up to a pressure increase of 1 atmosphere.

The catalyst components are separately introduced into the reactor through two separate metering devices, at first 0.55 millimoles of aluminum diethyl monochloride dissolved in 1.5 cc of anhydrous n-heptane and then 0.075 millimoles of vanadium triacetylacetonate dissolved in 1.5 cc of anhydrous toluene. During the polymerization the temperature is kept at −20° C and the pressure is kept constant by feeding ethylene in the amount absorbed. After 45 minutes, the reaction is stopped.

The olefins are vented and the product is purified in a separatory funnel by repeated treatments with diluted hydrochloric acid and then with water and is coagulated in acetone.

After vacuum drying, 27 g of solid product are obtained which is amorphous at the X-rays, looks like a non-vulcanized elastomer and is completely soluble in boiling n-heptane.

Infrared examination shows the presence of unsaturations (band at between 6 and 6.2 microns). The propylene content is 43% by weight.

The Mooney viscosity ML (1 +4) at 100° C is 109.

100 parts by weight of the terpolymer are mixed, on a laboratory roll mixer with 50 parts of HAF black, 1 part of tetramethylthiuramedisulphide, 5 parts of zinc oxide and 0.5 parts of mercaptobenzothiazole.

The mix is vulcanized in a press at 150° C for 60 minutes. A vulcanized lamina having the following characteristics is obtained:

| | |
|---|---|
| tensile strength | 194 kg/cm$^2$ |
| elongation at break | 420% |
| modulus at 200% | 78 kg/cm$^2$ |
| modulus at 300% | 132 kg/cm$^2$ |
| permanent set | 10% |

EXAMPLE 13

500 cc of liquid propylene, 4 cc of 5-ethylidene-norbornene-2 and 0.5 millimoles of zinc diethyl are introduced into the same reaction apparatus described in Example 12, kept at −20° C. Ethylene is introduced up to a pressure increase of 1 atmosphere. The two catalyst components are introduced into the reactor through two separate metering devices, at first 0.225 millimoles of vanadium oxytrichloride dissolved in 4.5 cc of anhydrous n-heptane and then 1.71 millimoles of aluminum diethyl monochloride dissolved in 4.5 cc of anhydrous n-heptane.

During the polymerization the temperature is kept at −20° C and the pressure is kept constant by feeding the absorbed ethylene. The reaction is stopped after 45 minutes. The olefins are vented and the product is purified and isolated as described in Example 12. After vacuum drying, 16 g of a solid product are obtained which is amorphous at the X-rays, looks like a nonvulcanized elastomer and is completely soluble in boiling n-heptane.

Infrared spectrographic examination shows the presence of unsaturations (band between 6 and 6.2 microns). The propylene content is 36% by weight. The Mooney viscosity ML (1 + 4) at 100° C is 123. The terpolymer is vulcanized at 150° C with the same mix of Example 12 and for different times. The properties of the vulcanizates are shown in the following table:

| Vulcanization time/minutes | Tensile strength kg/cm² | Elongation at break % | Modulus at 200% kg/cm² | Modulus at 300% kg/cm² | Permanent set % |
|---|---|---|---|---|---|
| 30 | 225 | 400 | 84 | 154 | 16 |
| 60 | 225 | 370 | 108 | 180 | 14 |
| 90 | 225 | 330 | 118 | 194 | 12 |
| 120 | 225 | 330 | 118 | 200 | 12 |
| 240 | 225 | 330 | 126 | 210 | 10 |

As will be apparent, changes and variations can be made in details, in practicing this invention, without departing from the spirit thereof. Therefore, we intend to include in the scope of the appended claims, those modifications of our invention as will be obvious to persons skilled in the art from the description and working examples given herein.

We claim:
1. Synthetic rubbers which are sulfur-vulcanized terpolymers consisting of high molecular weight, substantially linear, amorphous macromolecules made up of randomly distributed polymerized units of ethylene, polymerized units of at least one aliphatic alpha-olefin having the formula $CH_2 = CHR$ in which R is an alkyl group containing 1 to 6 carbon atoms, and polymerized units of 2-methallyl-norbornene-5 each of which is unsaturated, said terpolymers containing from about 5% to about 75% of polymerized ethylene, from about 5% to about 95% of polymerized aliphatic alpha-olefin, and from about 0.1% to about 20% of polymerized 2-methallyl-norbornene-5.

2. Synthetic rubbers which are sulfur-vulcanized terpolymers consisting of high molecular weight, substantially linear, amorphous macromolecules made up of randomly distributed polymerized units of ethylene, polymerized units of at least one aliphatic alpha-olefin having the formula $CH_2 = CHR$ in which R is an alkyl group containing 1 to 6 carbon atoms, and polymerized units of 2-isopropenyl-norbornene-5 each of which is unsaturated, said terpolymers containing from about 5% to about 75% of polymerized ethylene, from about 5% to about 95% of polymerized aliphatic alpha-olefin, and from about 0.1% to about 20% of polymerized 2-isopropenyl-norbornene-5.

3. Synthetic rubbers which are sulfur-vulcanized terpolymers consisting of high molecular weight, substantially linear, amorphous macromolecules made up of randomly distributed polymerized units of elthylene, polymerized units of at least one aliphatic alpha-olefin having the formula $CH_2 = CHR$ in which R is an alkyl group containing 1 to 6 carbon atoms, and polymerized units of 2(3'-methyl-butene-3'-yl)-norbornene each of which is unsuturated, said terpolymers containing from about 5% to about 75% of polymerized ethylene, from about 5% to about 95% of polymerized aliphatic alpha-olefin, and from about 0.1% to about 20% of polymerized 2(3'-methyl-butene-3'-yl)-norbornene.

* * * * *

UNITED STATES PATENT OFFICE
CERTIFICATE OF CORRECTION

Patent No. 4,025,497　　　　　Dated May 24, 1977

Inventor(s) Giulio NATTA et al

It is certified that error appears in the above-identified patent and that said Letters Patent are hereby corrected as shown below:

[75]　　The address of Guido Sartori should read

- - - Roselle, N.J. - - -.

Col. 1, line 34,　　"clas" should be - - - class - - -.

Col. 5, line 18,　　the word "of" after "amines" should be - - - or - - -.

Col. 6, line 49,　　"amourphous" should be - - - amorphous - - -.

Col. 7, line 43,　　"amourphous" should be - - - amorphous - - -.

Col. 8, line 7,　　the expression "[1/2 $Al_2$ $(C_5)_3 Cl_3$]" should read - - - [ 1/2 $Al_2$ $(C_2H_5)_3$ $Cl_3$]

Col. 8, line 20,　　"spectroraphic" should be - - - spectographic - - -.

Col. 9, line 44,　　"phenyl-beta-naphlamine" should be - - - phenyl-beta-naphthylamine - - -.

UNITED STATES PATENT OFFICE
CERTIFICATE OF CORRECTION

Patent No. 4,025,497  Dated May 24, 1977

Inventor(s) Giulio NATTA et al

It is certified that error appears in the above-identified patent and that said Letters Patent are hereby corrected as shown below:

Col. 10, line 9, "continuosly" should be --- continuously ---.

Col. 11, line 30, "300 l Nl/h" should be --- 300 Nl/h ---.

Col. 11, line 67, "6 l minutes" should be --- 6 minutes ---.

Col. 11, last line "0.1" should be --- 0.1 g ---.

Col. 12, the following language should appear before the tabulation at the end of Example 8:

--- A vulcanized sheet is obtained having the following characteristics: ---.

Col. 12, line 23, "stirred" after "comb" should be --- stirrer ---.

UNITED STATES PATENT OFFICE
CERTIFICATE OF CORRECTION

Patent No. 4,025,497      Dated May 24, 1977

Inventor(s) Giulio NATTA et al

It is certified that error appears in the above-identified patent and that said Letters Patent are hereby corrected as shown below:

Col. 12, lines 62-63,     "5-ethylidene-norborene-2" should be - - - 5-ethylidene-norbornene-2 - - -.

Col. 13, line 3,     "15 1 cc" should be - - - 15 cc - - -.

Claim 3, line 9,     "unsuturated" should be - - - unsaturated - - -.

Signed and Sealed this

Seventh Day of March 1978

[SEAL]

Attest:

RUTH C. MASON  
Attesting Officer

LUTRELLE F. PARKER  
Acting Commissioner of Patents and Trademarks